(12) United States Patent
Nielsen et al.

(10) Patent No.: US 8,426,994 B2
(45) Date of Patent: Apr. 23, 2013

(54) CONTROL OF WIND PARK NOISE EMISSION

(75) Inventors: Thomas Steiniche Bjertrup Nielsen, Randers (DK); Erik Billeskov Sloth, Ronde (DK); Niels Christian Moller Nielsen, Spjald (DK)

(73) Assignee: Vestas Wind Systems A/S, Aarhus N (DK)

( * ) Notice: Subject to any disclaimer, the term of this patent is extended or adjusted under 35 U.S.C. 154(b) by 196 days.

(21) Appl. No.: 13/121,718

(22) PCT Filed: Sep. 16, 2009

(86) PCT No.: PCT/DK2009/000204
§ 371 (c)(1),
(2), (4) Date: Mar. 30, 2011

(87) PCT Pub. No.: WO2010/037387
PCT Pub. Date: Apr. 8, 2010

(65) Prior Publication Data
US 2011/0175356 A1    Jul. 21, 2011

Related U.S. Application Data

(60) Provisional application No. 61/101,378, filed on Sep. 30, 2008.

(30) Foreign Application Priority Data

Sep. 30, 2008 (DK) ................................ 2008 01363

(51) Int. Cl.
*F03D 11/00* (2006.01)

(52) U.S. Cl.
USPC .............................................. 290/44; 290/55

(58) Field of Classification Search .................... 290/44, 290/55
See application file for complete search history.

(56) References Cited

U.S. PATENT DOCUMENTS

| 6,688,841 | B1 | 2/2004 | Wobben | |
|---|---|---|---|---|
| 8,021,110 | B2 * | 9/2011 | Kerber | 416/1 |
| 2004/0081322 | A1 * | 4/2004 | Schliep et al. | 381/57 |
| 2007/0031237 | A1 | 2/2007 | Bonnet | |

FOREIGN PATENT DOCUMENTS

| EP | 1944667 A1 | 7/2008 |
|---|---|---|
| WO | 03064853 A1 | 8/2003 |

OTHER PUBLICATIONS

European Patent Office, International Search Report issued in related International application No. PCT/DK2009/000204 dated Jan. 25, 2011.

* cited by examiner

*Primary Examiner* — Tho D Ta
(74) *Attorney, Agent, or Firm* — Wood, Herron & Evans, LLP

(57) ABSTRACT

According to the present invention is provided a method of control of noise emission from a wind park in operation, the wind park comprising a plurality of wind turbines. The method comprises the steps of • providing measurements of at least one wind speed and of at least one wind direction to a park noise emission emulation module including for each of two or more of the plurality of wind turbines a wind turbine noise emission model being suitable for producing a prediction of noise emission from the wind turbine as a function of at least one operational characteristic, the geographical position of each of the plurality of wind turbines, and the geographical position of at least one noise immission point, • emulating the noise level at the at least one noise immission point as a result of noise emitted by the plurality of wind turbines, and • controlling the operation of the wind park from the result of the emulation so as to prevent the noise level at the at least one noise immission point from exceeding a predetermined threshold level. Furthermore, the invention relates to a wind park.

15 Claims, 4 Drawing Sheets

CONTROL OF WIND PARK NOISE EMISSION

Figure 1:
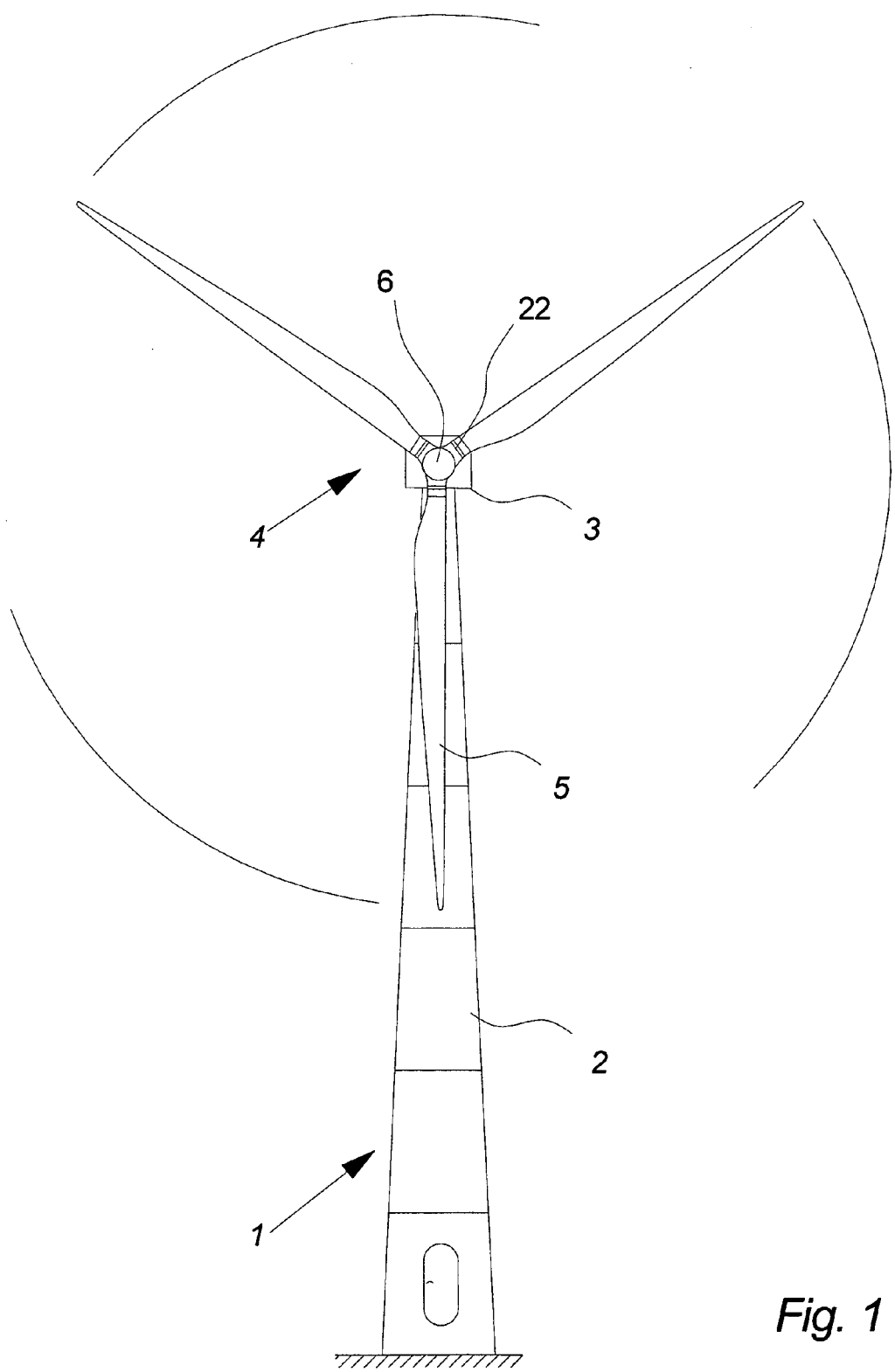

The present invention relates to control of noise emission from a wind park comprising a plurality of wind turbines.

BACKGROUND

Noise emission from wind parks is a well-known problem and has been the subject of extensive work, both with respect to the planning of new wind parks and to the operation of existing wind parks.

One solution to prevent the emitted noise from the wind turbines of the wind park from exceeding a predetermined level at a given immission point, typically a position in a residential area, is provided in U.S. Pat. No. 6,688,841 where the sound level is measured at the immission point and is used for controlling the operation of the wind turbine, e.g. by reduction of the rotational speed of individual wind turbines so as to lower the sound level at the immission point.

It may provide difficulties to arrange a sound level measurement device at the actual immission point of interest, and in US 2007/031237 a method is disclosed for controlling noise from a wind park by monitoring noise emission from the wind turbines in a near field area and utilizing a transfer function of noise emission to determine a noise impact importance of the wind turbines at one or more locations in a far field area beyond a boundary of the wind park.

Another method which is known in the art for controlling the noise emission from a wind park involves a test period after the erection of the wind park, where the noise at a number of immission points is measured and registered together with the varying wind speed and wind direction. The measurements are utilized to form an empirical set of operational rules for the wind park control system so as to prevent the noise at the immission points caused by the wind park to exceed a given threshold level. This method eliminates the requirement for permanent sound level measurement devices arranged in or around the wind park, but the power production of the wind park will often be somewhat lowered because the regulation of the wind turbines of the wind park, typically by lowering the rotational speed of the wind turbine rotors, will need to ensure that the noise threshold is not exceeded without having a noise measurement feedback.

An object of the present invention is therefore to provide for a method for controlling the noise emission from a wind park and at the same time to optimise the operation of the wind park with respect to power production.

BRIEF DESCRIPTION OF THE INVENTION

According to the present invention is provided a method of control of noise emission from a wind park in operation, the wind park comprising a plurality of wind turbines. The method comprises the steps of providing measurements of at least one wind speed and of at least one wind direction to a park noise emission emulation module including for each of two or more of the plurality of wind turbines a wind turbine noise emission model being suitable for producing a prediction of noise emission from the wind turbine as a function of at least one operational characteristic, the geographical position of each of the plurality of wind turbines, and the geographical position of at least one noise immission point, emulating the noise level at the at least one noise immission point as a result of noise emitted by the plurality of wind turbines, and controlling the operation of the wind park from the result of the emulation so as to prevent the noise level at the at least one noise immission point from exceeding a predetermined threshold level.

The wind turbine noise emission model is typically based on extensive measurements of noise emission from a single wind turbine of the type in question, so that the emitted noise as a precise function of some variables can be provided to the park noise emission emulation module. These variables may, apart from wind speed, be rotational speed of the wind turbine rotor, pitch angle of the blades, turbulence intensity of the wind and the vertical wind profile, also known as the wind shear. The wind park may comprise wind turbines of different types, i.e. of different rotor diameters, different blade types etc. and a wind turbine noise emission model will normally be provided for each of the types of wind turbines in the wind park.

The park noise emission emulation module is fundamentally a well known simulation model, where the individual wind turbine is handled as a noise source based on the wind turbine noise emission model and measured wind speed and optionally also other variables, and the propagation of the noise and the total noise level at the one or more immission points is calculated from well known principles.

The park noise emission emulation module is generally applied to estimate the event of excessive noise at one or more immission points with the result that the operation of the wind park is altered to prevent the predetermined threshold level to be exceeded. Also, in case the noise emission may be increased, the wind park is controlled accordingly. However, the park noise emission emulation module may furthermore be applied to foresee the result with respect to noise emission and power production of the wind park in case of a control strategy, and the module may be used to optimise the operation of the wind park with respect to power production and duly respect to the noise emission.

It is necessary to know the positions of each wind turbine in the wind park. The position of at least one immission point is also known and a threshold of permitted noise at that immission point. The wind turbine noise emission model can predict the noise of a wind turbine as function of operational parameters of the wind turbine.

The wind turbine noise emission model may also predict the noise of a wind turbine as a function of directivity as well. The instantaneous operational parameters of all wind turbines in the wind park may be known along with the power production of each wind turbine and orientation of each wind turbine. With this knowledge (in a control algorithm for a wind park) it is possible to control the noise from the wind turbine park and thereby give an optimum power output and prevent the noise at the at least one noise immission point from exceeding predetermined thresholds levels.

Thus, a more optimal operation of the wind park is achieved by the method of the present invention without requiring permanent sound level measurement devices to be arranged in or around the wind park.

The operational characteristic on which the noise emission from the individual wind turbine is produced by the wind turbine noise emission model may in a simple embodiment be the measured wind speed. However, the rotational speed of the rotor has an even more significant importance for the noise emission and may preferably be applied as an operational characteristic. The wind turbine power production is also an indication measure of the noise emitted and may be applied as an alternative to the rotational speed or the wind speed as an operational characteristic. Also, the blade pitch angle is, in particular in combination with the wind speed, a significant indication of the noise emission and may be an operational characteristic for the wind turbine noise emission model. However, the best result is achieved in case two or more of the above measures are applied as operational characteristics to the wind turbine noise emission model, such as a combination of the blade pitch angle, the rotational speed and the power production of the wind turbine.

In a particularly preferred embodiment, the park noise emission emulation module includes terrain orthography information of the geographical area including the wind park and the at least one noise immission point, such as occurrence of lakes or the see, of forests, hills and buildings, i.e. information regarding geographical features and ground characteristics that may influence the ground impedance to noise, noise absorption, turbulence and wind shear that allow a noise propagation model to be applied with a high reliability.

In an aspect of the invention the measured wind speed is utilized by the park noise emission emulation module as one of said operational characteristics.

The higher the wind speed is, the greater the chance is of the wind creating noise emitting turbulence or stall and the wind speed is therefore an important parameter in calculating the theoretical noise emission form a wind turbine and a wind turbine park In an aspect of the invention the method further comprises the step of providing measurements regarding the turbulence of the wind to the park noise emission emulation module.

If the wind is turbulent the risk of the wind locally causing e.g. noise emitting stall is increased. It is therefore advantageous to provide measurements regarding the turbulence of the wind to the park noise emission emulation module. The turbulence of the wind could e.g. be established by performing laser Doppler anemometry (LDA) on the wind.

In an aspect of the invention the method further comprises the step of providing measurements of wind speed in a plurality of vertical distances from the ground at a measurement station to the park noise emission emulation module.

If the speed of the wind varies much at different vertical heights the risk of local noise emitting turbulence or stall is increased and it is therefore advantageous to establish a wind velocity profile and thereby determining the wind shear.

In an aspect of the invention the park noise emission emulation module includes information of the height above the ground of the hub of at least some of the plurality of wind turbines.

The height above the ground of the hub is an important factor in relation to the distribution of the noise emitted by the wind turbine and it is therefore advantageous to make the park noise emission emulation module include information on the hub heights.

In an aspect of the invention the park noise emission emulation module comprises an optimisation routine that is applied, so that said control of the operation of the wind park from the result of the emulation is selected for an optimisation of the power production of the wind park.

Optimising the power output of the wind turbine in relation to the noise experienced at the noise immission point is advantageous in that it hereby is ensured that the wind park is producing power as efficiently as possible.

In an aspect of the invention at least some of the plurality of wind turbines are variable speed wind turbines and said control of the operation of the wind park comprises the step of reducing the rotational speed of at least some of the variable speed wind turbines of the wind park.

The rotating rotor is usually the biggest contributor to the collective noise output from an operating wind turbine and if the wind turbines are variable speed wind turbines adjusting the rotor speed is the most efficient way of controlling the noise emission from the wind turbine.

Alternatively—and particularly if the wind turbines are fixed speed wind turbines—may the produced power of some of the plurality of wind turbines of the wind park be reduced with up to e.g. 50% of the rated power of the wind turbines in question, or some of the wind turbines may be taken out of operation for a period of time.

In an aspect of the invention the method further comprises the step of providing measurements regarding air humidity to the park noise emission emulation model.

The humidity of the air can have a big influence on the airs ability to carry the noise and it is therefore advantageous to provide measurements regarding air humidity to the park noise emission emulation model.

In an aspect of the invention the method further comprises the step of providing measurements regarding occurrence of rain to the park noise emission emulation model.

If it is raining the noise emitted by the wind turbines in the wind park will be dampened to some extent before reaching the noise immission point and it is therefore advantageous to provide measurements regarding occurrence of rain to the park noise emission emulation model to ensure a more precise emulation.

In an aspect of the invention the method further comprises the step of predetermine the threshold level at the at least one noise immission point from the time of day and optionally also from the day of the week.

Local, national or other rules could prescribe a certain allowable noise level during the day time which would be different from the allowable noise level during the night time. It is therefore advantageous to predetermine the threshold level at the at least one noise immission point in relation to the time of day. Likewise, if the allowable noise level differ from e.g. the weekend to the weekdays it is advantageous to predetermine the threshold level at the at least one noise immission point in relation to the day of the week.

Furthermore, the invention relates to a wind park comprising a plurality of wind turbines and having control means for controlling the operation of the wind park according to any of the above-mentioned methods.

This is advantageous in that it hereby is possible to efficiently optimise the operation of the wind park both in relation to noise emission and power output.

FIGURES

Figure 2:
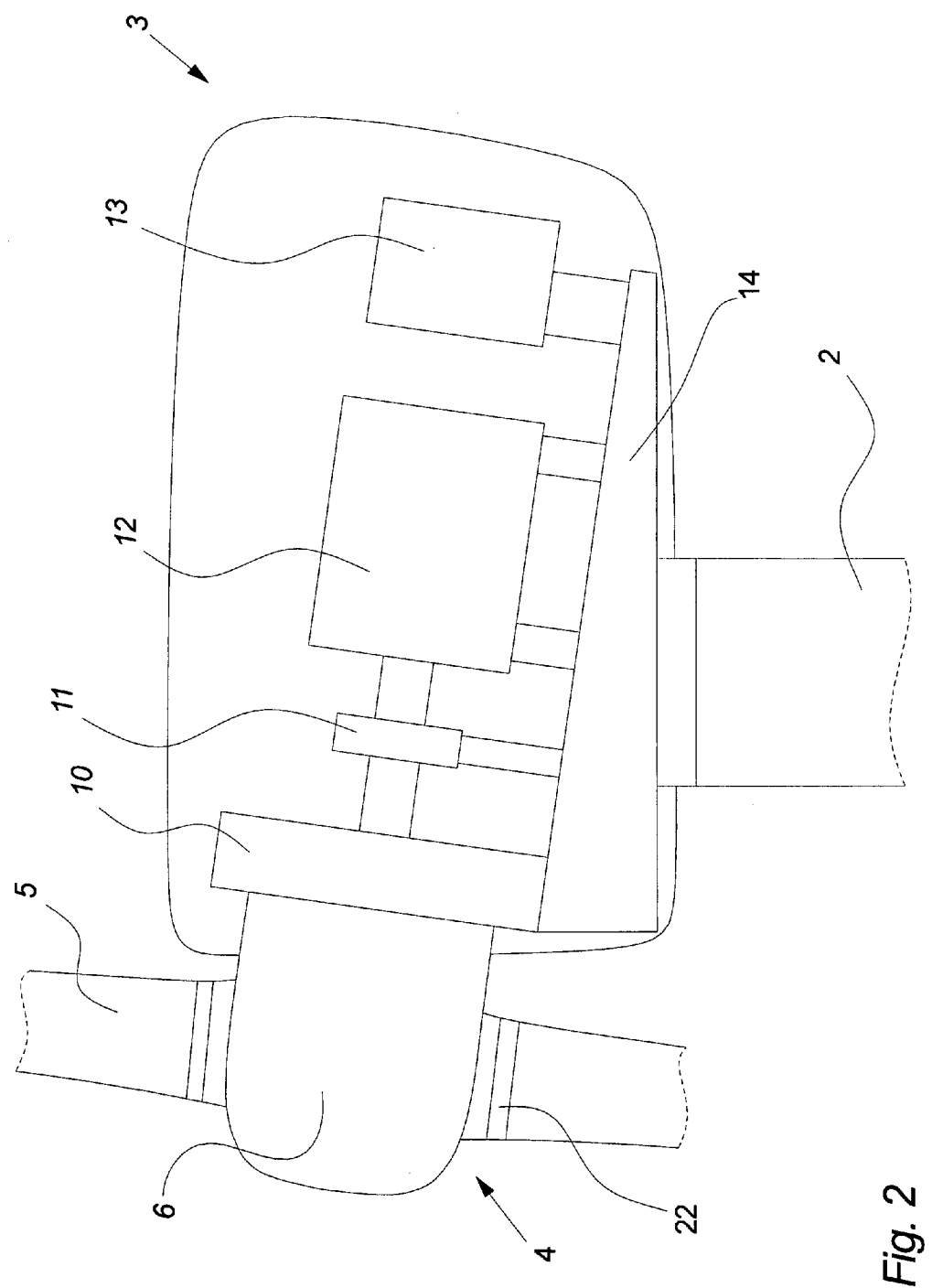
Figure 3:
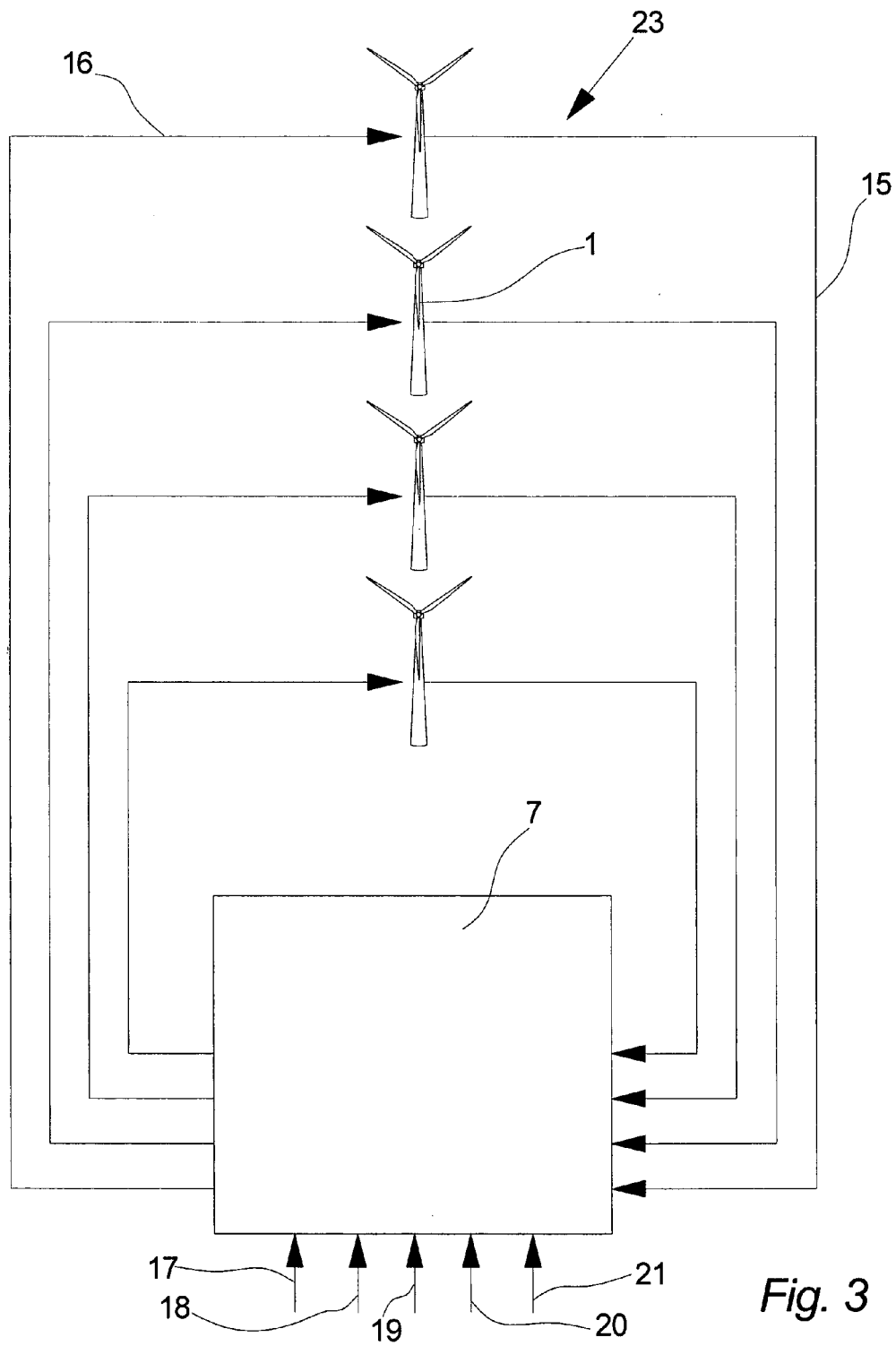
Figure 4:
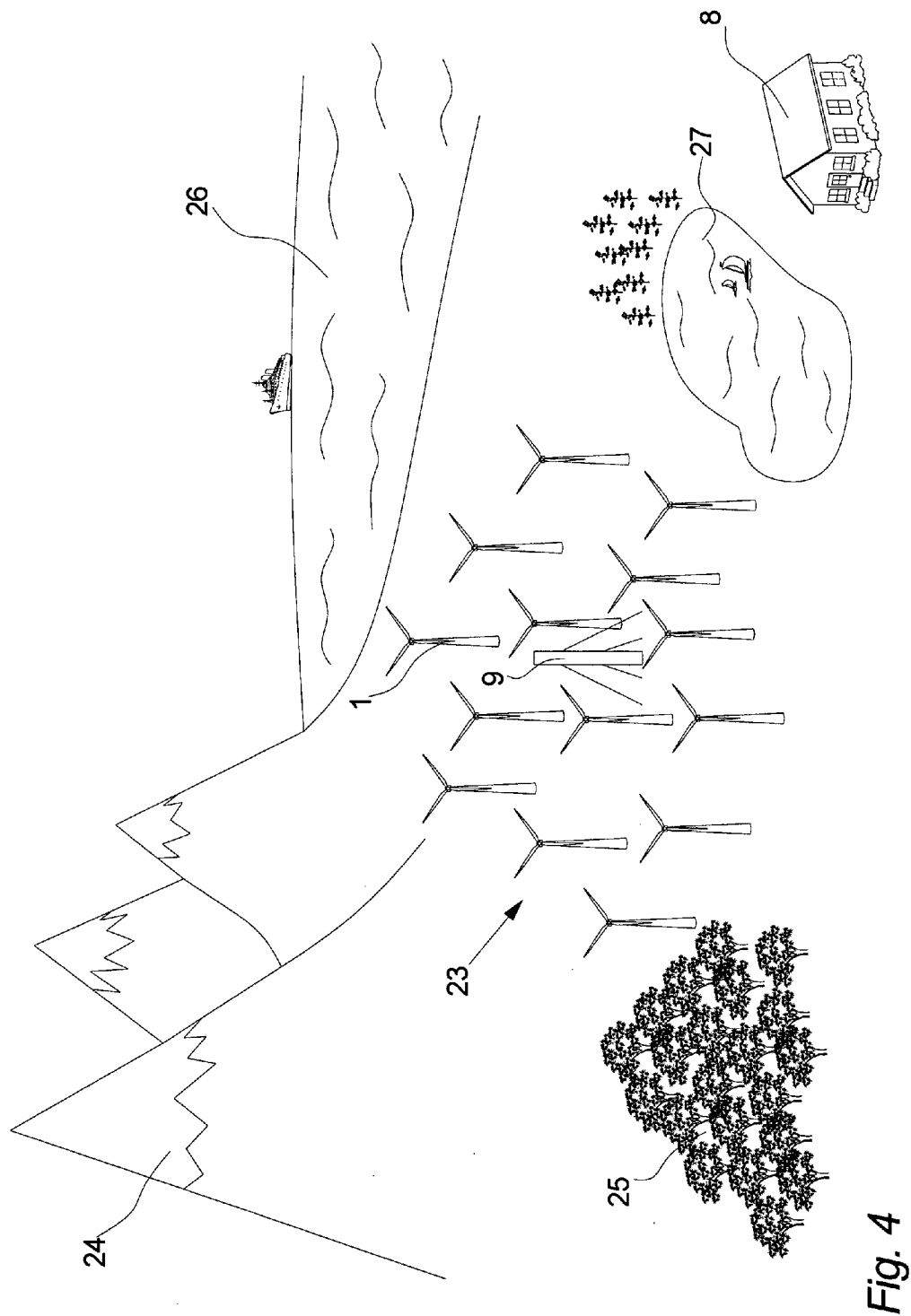

The invention will be described in the following with reference to the figures in which FIG. 1 illustrates a large modern wind turbine as known in the art, FIG. 2 illustrates a simplified cross section of a nacelle, as seen from the side, FIG. 3 illustrates a simplified embodiment of the signal flow to and from a park noise emission emulation module, and FIG. 4 illustrates a landscape with a wind turbine park and a noise immission point, as seen in perspective.

DETAILED DESCRIPTION OF RELATED ART

FIG. 1 illustrates a large modern wind turbine 1 as known in the art, comprising a tower 2 and a wind turbine nacelle 3 positioned on top of the tower 2. In this embodiment the wind turbine rotor 4 comprises three wind turbine blades 5 mounted on a common hub 6 which is connected to the nacelle 3 through the low speed shaft extending out of the nacelle 3 front. In another embodiment the wind turbine rotor 4 could comprise another number of blades 5 such as one, two, four, five or more.

FIG. 2 illustrates a simplified cross section of a nacelle 3 of a prior art wind turbine 1, as seen from the side. Nacelles 3 exists in a multitude of variations and configurations but in most cases the drive train in the nacelle 3 almost always comprise one or more of the following components: a gearbox 10, a coupling (not shown), some sort of breaking system 11 and a generator 12. A nacelle 3 of a modern wind turbine 1 can also include a converter 13 (also called an inverter) and additional peripheral equipment such as further power handling equipment, control cabinets, hydraulic systems, cooling systems and more.

The weight of the entire nacelle 3 including the nacelle components 10, 11, 12, 13 is carried by a nacelle structure 14. The components 10, 11, 12, 13 are usually placed on and/or connected to this common load carrying nacelle structure 14. In this simplified embodiment the load carrying nacelle structure 14 only extends along the bottom of the nacelle 3 e.g. in form of a bed frame to which some or all the components 10, 11, 12, 13 are connected. In another embodiment the load carrying structure 14 could comprise a gear bell which through the main bearing could transfer the load of the rotor 4 to the tower 2, or the load carrying structure 14 could comprise several interconnected parts such as latticework.

In this embodiment the blades 5 of the wind turbine rotor 4 are connected to the hub 6 through pitch bearings 22, enabling that the blades 5 can rotate around their longitudinal axis.

The pitch angle of the blades 5 could then e.g. be controlled by linear actuators, stepper motors or other means for rotating the blades 5 (not shown) connected to the hub 6 and the respective blade 5.

DETAILED DESCRIPTION OF THE INVENTION

FIG. 3 illustrates a simplified embodiment of the signal flow to and from a park noise emission emulation module 7.

In this embodiment of the invention the park noise emission emulation module 7 is provided with input 15 from each of the wind turbine 1 in the wind turbine park 23 regarding the rotor speed, the wind speed and wind direction at each wind turbine 1.

The information about the rotor speed is used for calculating the noise emitted for the given wind turbines 1 based on a pre-established wind turbine noise emission model. In another embodiment of the invention the noise emission could also be calculated on the basis of the power output, on pitch angle settings and/or the rotor speed and/or power output could be estimated based on local information on wind speed.

The information on wind direction and wind speed is primarily used for calculating the emitted noises distribution from the source to the noise immission point 8 i.e. the noise level at the noise immission point 8.

However, in another embodiment the only input 15 from the park 23 to the park noise emission emulation module 7 could be one or more signals containing information on one or more operational parameters of the wind turbines 1 or the wind speed and the wind direction could e.g. be measured on only one wind turbine 1, at a central meteorological station or at least only a few signals from representative wind turbines 1 or meteorological station placed in or near the wind turbine park 23 could be provided to the park noise emission emulation module 7.

In this embodiment the wind turbine park 23 only provides information regarding wind speed and wind direction at each wind turbine 1 but in another embodiment the wind turbines 1 could further provide further local meteorological data such as information about temperature, humidity, rain or snow at the given wind turbine 1 or meteorological station and/or the wind turbine 1 could provide the park noise emission emulation module 7 with further actual operational data such as rotor speed, power output, pitch angle or other or each or some of the wind turbines 1 could be provide with noise measurements means for providing information on the actual noise level at the given wind turbine 1. These noise measurements means could of cause also be arranged locally or centrally at dedicated noise measurement sites.

In another embodiment of the invention the meteorological data could be provide from a remote source e.g. from the Internet.

The information on operational parameters of the wind turbines, wind speed and wind direction is in this embodiment provided continuously but in another embodiment the information could be provided upon request or at given time intervals. However, it is of cause important that information on the actual operational parameters, wind speed and the actual wind direction is provided to the park noise emission emulation module 7 regularly i.e. at least every half hour to ensure that a given noise threshold is not exceeded at a given immission point 8 and to ensure the reliability and accuracy of the system.

The park noise emission emulation module 7 is further provided with information on terrain orthography 18 of the park 23, of the surroundings of the park 23 and/or of the surroundings of the immission point 8. These information is delivered once and can than e.g. be updated if significant changes happens.

The park noise emission emulation module 7 is also provided with information on the geographical position 19 of the individual wind turbines 1 or at least or the extent of the park 23 and with information on the geographical position 20 of one or more immission points 8 and the threshold level 21 at each of these immission points 8.

The threshold level 21 could e.g. depend on the time of day i.e. it is not uncommon that a wind turbine park 23 is allowed to emit more noise during the day time than during the night time and correct threshold level 21 could therefore be provided at any time or the park noise emission emulation module 7 could further be provided with means for establishing the time of day or the information on the time of day could be provided to the park noise emission emulation module 7. Likewise, if seasonal changes would influence the noise threshold level at a given noise immission point 8 or influence the calculations of the noise level at the immission points 8 e.g. if the trees carry leaves or not the park noise emission emulation module 7 could also be provided with means for establishing the time of year or the information on the time of year could be provided to the park noise emission emulation module 7.

The park noise emission emulation module 7 is also provided with a wind turbine noise emission model of the wind turbines 1 in the park 23. The wind turbine noise emission model could be the same for all the wind turbines 1, it could be the same for all wind turbines 1 of the same type or the same configuration (i.e. same rotor span, same hub height, same drive train configuration or other) or it could be a model established especially for every individual wind turbine 1. By means of this wind turbine noise emission model it is possible to predict/calculate the noise emitted by the wind turbine 1 e.g. at a given power output, rotor speed, pitch angle and/or other.

Based on all these information the park noise emission emulation module 7 can continuously, at certain time intervals or upon request calculate a emulator module output 16 in the form of a control reference signal such as a rated power set-point or a rated rotor speed set-point and provide this to the individual wind turbines 1 or to a group of wind turbines 1 within the park 23.

The emulator module output 16 could also comprise orders to shut down one or more wind turbines having the most impact noise-wise on the noise immission point 8 e.g. to ensure unadjusted normal operation of the remaining wind turbines 1 in the wind park 23.

E.g. if a park contains one hundred wind turbines maybe only the twenty wind turbines 1 closes to a given noise immission point 8 significantly influences the noise level at the noise immission point 8 and therefore the operation on only these twenty wind turbines will be controlled in relation to the given noise immission point 8. Or the wind speed and/or particularly the wind direction could decide which wind turbines should be controlled to maintain an acceptable noise level at a given noise immission point 8.

In another embodiment all the wind turbines 1 of the wind park 23 could be controlled identically in relation to the calculated noise level at a given noise immission point 8.

In a further embodiment all the wind turbines 1 of the wind park 23 could be controlled completely individually in relation to each of the one or more noise immission points 8.

FIG. 4 illustrates a landscape with a wind turbine park 23 and a noise immission point 8, as seen from in perspective.

In this embodiment of the invention the wind turbine park 23—comprising a plurality of individual wind turbines 1—is located in a scenery next to mountains 24, a forest 25 and the ocean 26. A noise immission point 8 in the form of an occupied house is located opposite a lake 27 in relation to the wind turbine park 23.

Each of the wind turbines 1 in the wind turbine park 23 generate noise when the wind turbines 1 are in operation i.e. when the wind turbines 1 are producing power to a utility grid and usually local or national rules and regulations prescribe the allowable noise level at a given immission point 8. Among other things the experienced noise level at a given immission point 8 is affected by the orthography of the terrain in and surrounding the wind turbine park 23 and particularly between the park 23 and the noise immission point 8 and the influence of given terrain orthography among other change with the speed of the wind and particularly the direction of the wind.

The distribution of the noise from the wind turbines 1 could also be affected to greater or lesser extent by meteorological conditions such as air temperature, air humidity or other. E.g. if the air temperature is below 0° C. there is a increased risk of the lake 27 being frozen which will affect the distribution of the noise between the wind park 23 and the noise immission point 8. Likewise, if the ground is covered by snow or if it is raining the noise distribution will be affected.

The invention has been exemplified above with reference to specific examples of wind turbine parks 23, park noise emission emulation modules 7 and other. However, it should be understood that the invention is not limited to the particular examples described above but may be designed and altered in a multitude of varieties within the scope of the invention as specified in the claims.

LIST

1. Wind turbine
2. Tower
3. Nacelle
4. Rotor
5. Blade
6. Hub
7. Park noise emission emulation module
8. Noise immission point
9. Measurement station
10. Gearbox
11. Breaking system
12. Generator
13. Converter
14. Nacelle structure
15. Emulator module input
16. Emulator module output
17. Further meteorological data
18. Terrain orthographical information
19. Geographical position of wind turbine
20. Geographical position of immission point
21. Threshold level
22. Pitch bearing
23. Wind turbine park
24. Mountain
25. Forest
26. Ocean
27. Lake

The invention claimed is:

1. A method of control of noise emission from a wind park in operation, the wind park comprising a plurality of wind turbines, the method comprising:
    providing measurements of at least one wind speed and of at least one wind direction to a park noise emission emulation module including, for each of two or more of said plurality of wind turbines, a wind turbine noise emission model being suitable for producing a prediction of noise emission from the wind turbine as a function of at least one operational characteristic, the geographical position of each of said plurality of wind turbines, and the geographical position of at least one noise emission point,
    emulating the noise level at the at least one noise emission point as a result of noise emitted by said plurality of wind turbines, and
    controlling the operation of the wind park from the result of the emulation so as to prevent the noise level at the at least one noise emission point from exceeding a predetermined threshold level.

2. The method of claim 1, wherein the park noise emission emulation module includes terrain orthography information of the geographical area including the wind park and the at least one noise emission point.

3. The method of claim 1, wherein at least some of the plurality of wind turbines are variable speed wind turbines, and further comprising:
    providing a measure of the rotor speed of these wind turbines to the park noise emission emulation module as one of said operational characteristics.

4. The method of claim 1, wherein at least some of the plurality of wind turbines comprises means for changing the blade pitch angle, and further comprising:
    providing a measure of the blade pitch angle of these wind turbines to the to the park noise emission emulation module as one of said operational characteristics.

5. The method of claim 1, further comprising:
    providing a measure of the power output from at least some of the plurality of wind turbines to the to the park noise emission emulation module as one of said operational characteristics.

6. The method of claim 1, wherein the measured wind speed is utilized by the park noise emission emulation module as one of said operational characteristics.

7. The method of claim 1, further comprising:
providing measurements regarding the turbulence of the wind to the park noise emission emulation module.

8. The method of claim 1, comprising:
providing measurements of wind speed in a plurality of vertical distances from the ground at a measurement station to the park noise emission emulation module.

9. The method of claim 1, wherein the park noise emission emulation module includes information of the height above the ground of the hub of at least some of the plurality of wind turbines.

10. The method of claim 1, wherein the park noise emission emulation module comprises an optimization routine that is applied, so that said control of the operation of the wind park from the result of the emulation is selected for an optimization of the power production of the wind park.

11. The method of claim 1, wherein at least some of the plurality of wind turbines are variable speed wind turbines, and said control of the operation of the wind park comprises the step of reducing the rotational speed of at least some of the variable speed wind turbines of the wind park.

12. The method of claim 1, further comprising:
providing measurements regarding air humidity to the park noise emission emulation model.

13. The method of claim 1, further comprising:
providing measurements regarding occurrence of rain to the park noise emission emulation model.

14. The method of claim 1, further comprising:
predetermining the threshold level at the at least one noise emission point from the time of day and optionally also from the day of the week.

15. A wind park comprising a plurality of wind turbines and having control means for controlling the operation of the wind park according to claim 1.

\* \* \* \* \*